July 16, 1929.   C. H. PARSONS   1,721,406
MEAT CHEESE LOAF AND METHOD OF PREPARING SAME
Filed July 21, 1928   2 Sheets-Sheet 1
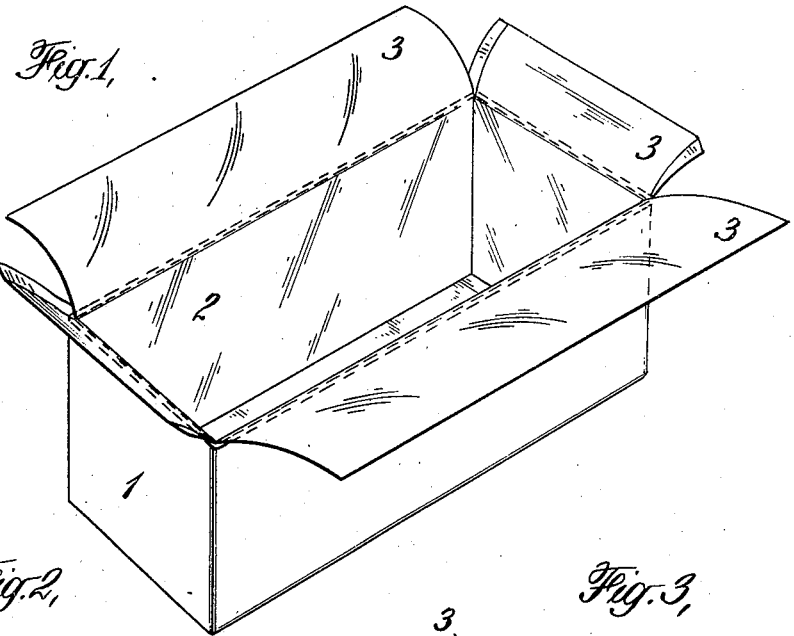
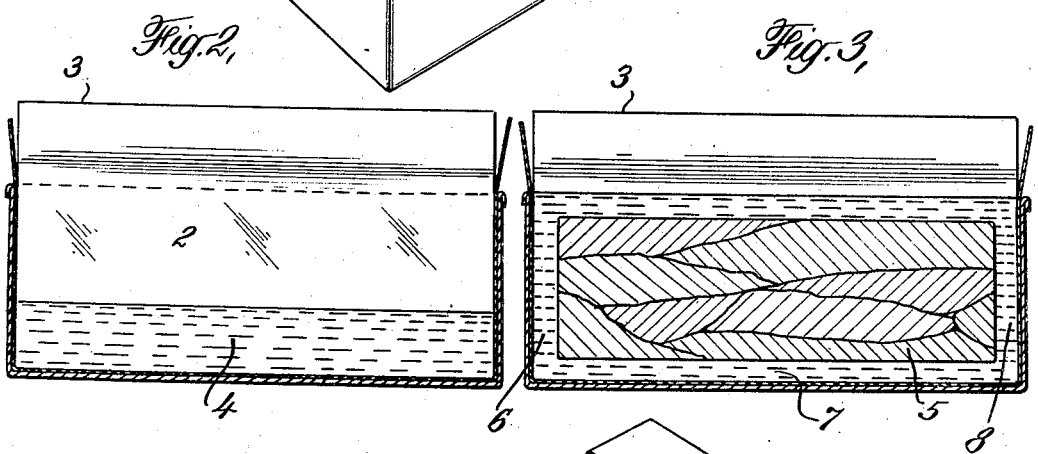
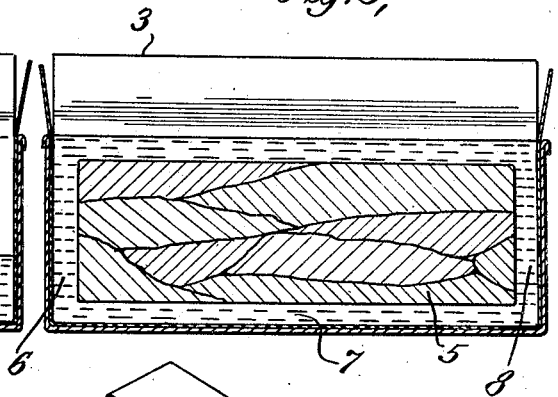
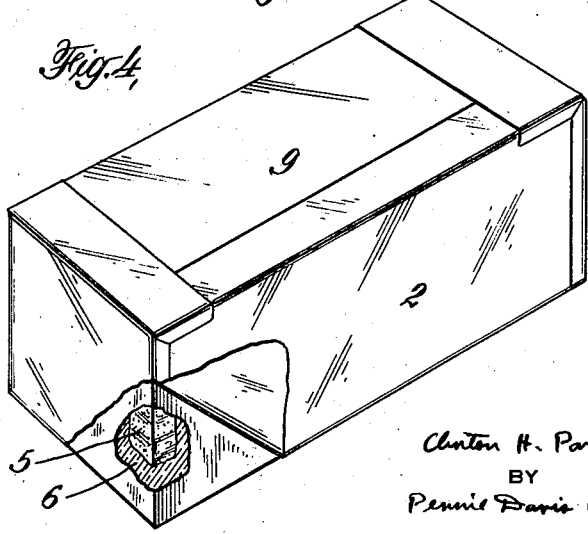
INVENTOR
Clinton H. Parsons
BY
Pennie Davis Marvin Edmond
ATTORNEYS July 16, 1929.   C. H. PARSONS   1,721,406
MEAT CHEESE LOAF AND METHOD OF PREPARING SAME
Filed July 21, 1928   2 Sheets-Sheet 2
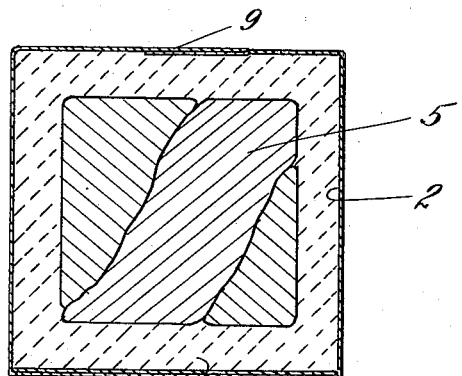
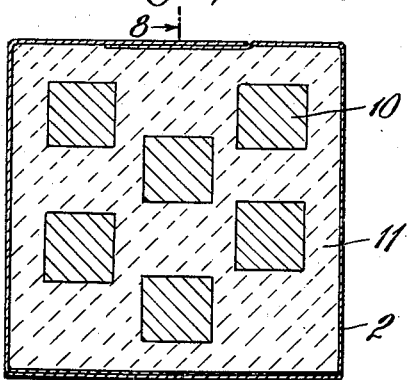
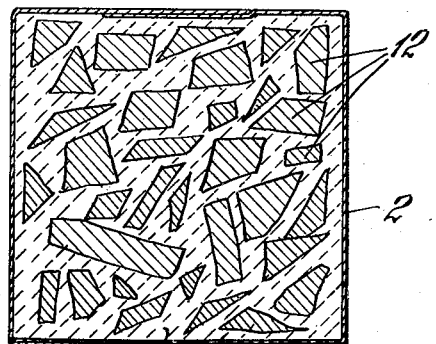
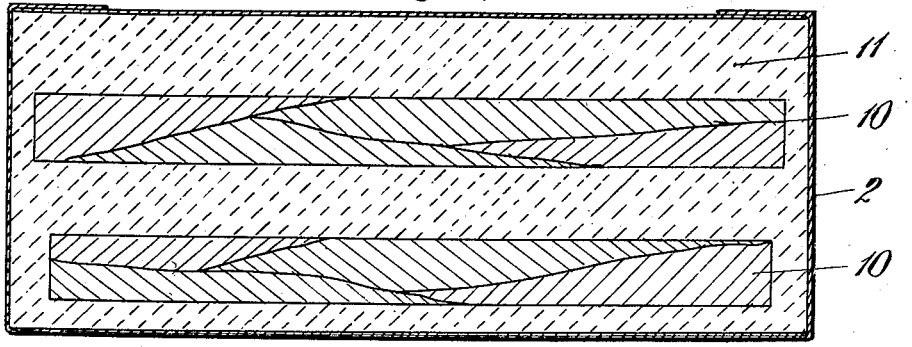
Clinton H Parsons INVENTOR
BY
ATTORNEYS Patented July 16, 1929.

1,721,406

UNITED STATES PATENT OFFICE.

CLINTON HENRY PARSONS, OF CHICAGO, ILLINOIS, ASSIGNOR TO SWIFT & COMPANY, OF CHICAGO, ILLINOIS, A CORPORATION OF ILLINOIS.

MEAT-CHEESE LOAF AND METHOD OF PREPARING SAME.

Application filed July 21, 1928. Serial No. 294,456.

This invention relates to a new meat-cheese loaf product, and includes the new product and an improved method of making it.

The new food product comprises cooked or partially cooked meats surrounded by a layer of cheese and with the cheese enclosed by a covering of tinfoil.

The new process of producing the food product comprises embedding the cooked or partly cooked meat in hot molten emulsified cheese in a tinfoil lined mold and thereby surrounding the meat with the molten cheese, and cooling and solidifying the cheese to give a meat-cheese loaf enclosed in tinfoil.

The improved process and food product of the present invention will be further illustrated by the following more detailed description, but it will be understood that the invention is not limited thereto.

The meat which is employed in the present process and product is first cooked or partially cooked and may be meat such as roast or boiled beef, veal, pork, tongues, etc. The meat is preferably cooked in a mold of predetermined shape and size, smaller than the loaf in which it is to be incorporated. It may have cereals, dried milk, or condiments mixed therewith, in the case of chopped meats, or it may be made up of pieces or blocks of meat one or more of which fills the mold. If no cereals or like substances are used in the preparation of the product, the mold may be perforated in order to allow the water which may be expelled from the meat, during cooking, to escape. After the meat has been properly cooked and pressed it is then withdrawn from the mold, either hot, partially cooled, or cold. It is now ready to be incorporated with the cheese emulsion.

The cheese which is employed in the present process in making the new food product is cheese which can be melted or heated to a hot fluid state without objectionable butter fat separation. Such cheese I refer to as emulsified cheese. It may be emulsified and pasteurized or sterilized by the processes of prior Patents Nos. 1,522,384 or 1,522,385 or by other convenient methods. Care should be exercised in properly blending the cheese for this emulsion as it is important to produce a sticky, fairly fluid emulsion that will not break down under high temperatures. As an example may be mentioned a mixture made up of about one-third of fresh full cream cheese, one-third high quality aged full cream cheese and one-third of half skimmed milk cheese. This mixture of the cheese is finally comminuted and mixed with about 2 to 7 per cent of water, about ½ to 1 per cent of salt and with about 2 to 3 per cent of an emulsifying agent, such as sodium potassium tartrate. The cheese mixture is made into an emulsion in such a manner as to be sticky and fairly fluid when hot. The temperature at which this emulsion should be finished will be such as to suit the requirements of the meat.

The preparation of the new meat-cheese loaf product will be further described in connection with the accompanying drawings which are illustrative of the invention, although the invention is not limited thereto.

In the accompanying drawings:

Fig. 1 shows a suitable metal mold lined with tinfoil;

Fig. 2 shows the mold partly filled with the hot molten cheese emulsion;

Fig. 3 shows a meat loaf embedded in the cheese emulsion;

Fig. 4 shows the completed loaf wrapped in tinfoil with parts cut away;

Fig. 5 is a cross section of the loaf of Figs. 3 and 4;

Fig. 6 is a cross-section of a modified loaf;

Fig. 7 is a cross-section of another modified loaf; and

Fig. 8 is a longitudinal section of the loaf of Fig. 6 taken on the line 8—8.

In packaging the meat and cheese and making the new meat-cheese loaf a mold of predetermined size and shape is lined with metal foil in such a manner as to have sufficient foil overlapping the ends and sides of the mold so that when it is filled with meat and cheese emulsion this foil can be folded over the top so as to overlap itself and adhere to the hot molten cheese and effectively seal the loaf from the air. A suitable mold 1 lined with metal foil 2 and ready to be filled is illustrated in Fig. 1.

The mold lined with metal foil is now partially filled with the hot cheese emulsion which may be prepared as above described. A mold partly filled with such an emulsion is illustrated in Fig. 2, the emulsion being indicated at 4. A meat loaf which is of smaller cross-section than the mold and also shorter than the mold is now placed in the center of the mold and gently pushed toward the bottom thus forcing the liquid cheese around the ends and sides of the meat loaf in sufficient quantity to cover the top, so that the meat loaf is entirely enclosed in the hot molten cheese. By adding the right quantity of cheese in the mold, with reference to the size of the mold and of the meat loaf, the mold will be level full after the meat has been placed in the center, as illustrated at 5 in Figs. 3 and 4. The tinfoil is now folded over the top and the package turned bottom side up on a smooth surface to cool. If this operation is carried out properly there will be an even layer of cheese covering and surrounding the entire surface of the meat loaf. By reference to Figs. 3, 4 and 5 it will be seen that the meat loaf 5 is made up of pieces of meat molded together into the size of a loaf smaller than the mold, and is completely surrounded by cheese 6, 7, 8 at the bottom, sides and ends and top of the mold. The tinfoil lining 2 has its flaps or projections 3 folded in as indicated at 9 to enclose and cover the loaf at the top. The result is a meat-cheese loaf enclosed in metal foil, and with the meat in turn enclosed within the cheese which is enclosed by an adhering layer of metal foil.

The meat employed will be sterilized by the cooking operation to which it is subjected, but if it is cooled and becomes contaminated with mold or bacteria, the temperature of the hot cheese emulsion should be sufficiently high to sterilize the outer surface of the meat or to destroy for the most part any mold or bacteria which may have contaminated the meat during the transferring operation. Where the meat is transferred hot and in a sterile condition the molten cheese need not be at such a high temperature but it should be sufficiently fluid to produce an effective seal to the meat. The cheese should also, as above pointed out, be sufficiently fluid to flow around the meat loaf and sufficiently adhesive to adhere effectively to it. With cold meat loaf the cheese temperature may be around 180 to 190° F. while with hot meat the temperature may be somewhat less. The cheese should itself be pasteurized or sterilized before it is employed so as to impart good keeping qualities to the finished product.

When a solid loaf of meat is employed as the core of the meat-cheese loaf, as illustrated in Figs. 3 to 5, the meat loaf may be made up of pieces of meat compressed together into a loaf. As an example, pieces of tongue may be formed into a loaf which after cooking is embedded in the hot molten cheese to form such a loaf as that shown in Fig. 5, having a core of tongue loaf entirely surrounded by a protecting layer of cheese which will in turn be covered and protected by an adhering metal foil. A typical cross-section of such a loaf will show a core of tongue meat surrounded by a border of cheese and an outside layer of metal foil.

Instead of forming the cooked or partially cooked meat into a loaf and embedding the loaf as a core in the cheese, as above described, the meat may be used in other form and coated with the molten emulsified cheese to form a loaf covered with metal foil or other protective coating. Certain other forms are illustrated in Figs. 6 to 8. In Fig. 6 several small strips 10 of meat are embedded in the cheese, these strips being somewhat shorter than the completed loaf as illustrated in Fig. 8. These strips may be made up, for example, of tongue or other meat. The strips are entirely enclosed in the cheese 11 which in turn is enclosed by metal foil 2. In Fig. 7, pieces of meat 12, in the form of cubes, or pieces of irregular size, are embedded in the cheese 13 and the whole is enclosed by the metal foil 2. As illustrated in Fig. 7, the present invention is not limited to the use of meats which have been pressed in a mold, but can be applied to cooked or partially cooked meats of various kinds, in one or many pieces, each piece being coated with a layer of cheese and the whole placed in a mold and sealed in tinfoil, or other similar protective coating, in the manner described.

The external appearance of the new product will show only the tinfoil which, however, may be marked so as to permit the cutting of the finished loaf into portions of definite size or weight. The consumer can be assured of obtaining a product which has not been handled except by cutting a portion of the loaf where an entire loaf is not purchased. The tinfoil surrounding the product can be attractively printed in such a manner that each portion where the product is cut with the tinfoil will be identifiable with the brand of the manufacturer.

The appearance of the new product when cut, for example, into slices, will depend upon the form in which the meat is incorporated in the cheese. With a loaf such as shown in Figs. 3 to 5, the slices, except those at the end of the loaf, will have the appearance shown in Fig. 5, namely with a central core of meat loaf entirely surrounded by cheese which, in turn, is surrounded by the tinfoil, unless the tinfoil is first removed. Where the meat is in some other form than that of a solid central core, or meat loaf, the slices of the loaf will have a different appearance, for example, as illustrated in Figs. 6 and 7.

The new food product can be made in the form of loaves of different sizes and shapes, for example, one-pound loaves, or five-pound loaves, etc., and may be of such size that slices can be used directly for making sandwiches, each slice being of the same size as a slice of bread. It may be cut like a loaf of bread or sliced into very thin slices either by hand or a mechanical slicing machine. Where a portion of a loaf is cut from it, as in dispensing it over the retail counter, the loaf is cut with the foil on it and the remainder of the loaf will have its outside surfaces protected by the metal foil.

The cheese and meat of the loaf will ordinarily have a contrasting appearance. The meat will have its natural appearance, namely that of cooked meat. The cheese, however, may be selected or compounded so that it is either white or colored, and in this way a contrasting appearance between the meat and the cheese can be obtained. The cheese may have compounded or blended with it certain condiments such as paprika, pimento, green peppers, pickles and the like, thus imparting a varied appearance or taste, or both, to the cheese.

The new food product of the present invention can be kept for considerable periods of time as the method of packaging serves to preserve and protect the product. I have discovered that the coating of cooked or partly cooked meats with a layer of cheese furnishes an excellent method of preservation. The hot, partially cooled or cold meat is coated with cheese at a sufficiently high temperature to destroy the bacteria which may have contaminated the surface of the meat during its transfer from the cooking vessel to the coating mold. The cheese coating clings effectively and tenaciously to the meat, thus affording an effective coating for the meat and excluding air from the meat, thus preventing the growth of mold and slime which is responsible, to a large extent, for the spoilage of cooked meat. The outer layer of cheese is in turn protected by metal foil and the finished product does not need to be dipped in a sealing fluid in order to insure its keeping quality.

It will thus be seen that the present invention provides a new and improved process of preparing loaf meats and like products whereby such products can be preserved in such a manner as to render them commercial products; and that the present invention provides not only a new and improved method of preparing meat, but also a new and attractive food product which is nutritious and has an appetizing and pleasing flavor, and which can be readily sliced and used in making sandwiches. The present method of making the new product is practical, inexpensive to operate, overcomes the obstacles and objections heretofore encountered in the making of loaf meat, and produces an attractive food product which can readily be dispensed and used without waste and which has commercial keeping qualities.

If metal foil is applied directly to cooked meats, it does not readily adhere, if at all, to the meat so that a satisfactory package from a merchandizing standpoint is not readily produced. If the cooked meat is exposed to the air before enclosing in tinfoil and contaminated before it is wrapped in the metal foil, the growth of mold or slime on the meat loaf surface, under the foil, would tend to take place in a comparatively short time, and the tinfoil covering would tend to keep the surface moist, a condition which is favorable for mold and slime growth. The present invention overcomes such objections by coating and embedding the cooked meat in a sterilizing and adhering layer of hot molten cheese which in turn is sealed in metal foil to give an attractive and commercially valuable food product.

I claim:

1. The method of preparing a new meat-cheese product which comprises so positioning meat, hot molten emulsified cheese, and a protective covering that cheese is arranged between the covering and the meat for effecting an adherence of the cheese to the covering and in turn the cheese to the meat, the adherence between the respective materials being effected by having the cheese contact with the protective covering and with the meat while in a molten condition.

2. The method of preparing a meat-cheese product which comprises forming a hot cheese emulsion and filling a mold partly full with it, embedding cooked meat in the hot cheese emulsion to effect an enclosure of the meat in the emulsion, and completely enclosing the cheese-covered meat in tinfoil while the cheese is still hot.

3. The method of preparing a meat-cheese product which comprises lining a mold with tinfoil, partly filling the mold with hot cheese emulsion at a sufficiently high temperature to effectively sterilize the surface of meat embedded therein, embedding cooked meat in such hot molten cheese, covering the exposed surface of the cheese with metal foil while the cheese is still hot, and cooling the resulting product to form a meat-cheese loaf.

4. A food product comprising cooked meat enclosed in a layer of cheese closely adhering thereto, and in which the inner surface of the cheese conforms to any irregularities of the meat as a result of having been contacted therewith while in a molten condition.

5. A food product comprising cooked meat enclosed in a layer of emulsified cheese closely adhering thereto, the cheese on the inner surface conforming to any irregularities of the meat, and a protective covering of tinfoil adhering to the outer surface of the cheese.

In testimony whereof I affix my signature.

CLINTON HENRY PARSONS.